(12) United States Patent
Chamley et al.

(10) Patent No.: US 8,261,996 B2
(45) Date of Patent: Sep. 11, 2012

(54) SMART CARD, TELEPHONE COMPRISING SUCH A CARD AND METHOD FOR EXECUTING A COMMAND IN SUCH A CARD

(75) Inventors: Olivier Chamley, Leognan (FR); Lorenzo Stranges, Neuilly sur Seine (FR)

(73) Assignee: Oberthur Technologies, Levallois-Perret (FR)

( * ) Notice: Subject to any disclaimer, the term of this patent is extended or adjusted under 35 U.S.C. 154(b) by 797 days.

(21) Appl. No.: 12/270,153

(22) Filed: Nov. 13, 2008

(65) Prior Publication Data
US 2009/0127345 A1 May 21, 2009

(30) Foreign Application Priority Data

Nov. 13, 2007 (FR) .................................. 07 59010

(51) Int. Cl.
*G06K 19/06* (2006.01)
(52) U.S. Cl. ........................................ 235/492
(58) Field of Classification Search .................. 235/492, 235/435, 487
See application file for complete search history.

(56) References Cited

U.S. PATENT DOCUMENTS

| 5,049,728 A | 9/1991 | Rovin |
| 6,676,022 B1 * | 1/2004 | Guthery et al. ............... 235/492 |
| 7,303,136 B2 * | 12/2007 | Tsunoda et al. ............... 235/492 |
| 7,836,234 B2 * | 11/2010 | Erdmenger et al. .......... 710/110 |
| 2005/0270840 A1 * | 12/2005 | Kudelski .................. 365/185.04 |
| 2006/0079284 A1 * | 4/2006 | Lu et al. ........................ 455/558 |

FOREIGN PATENT DOCUMENTS

| DE | 44 06 704 | 7/1995 |
| DE | 196 18 103 | 11/1997 |
| EP | 0 534 559 | 3/1993 |
| EP | 0 738 966 | 10/1996 |
| EP | 1 280 066 | 1/2003 |
| EP | 1 603 088 | 12/2005 |
| FR | 2 840 421 | 12/2003 |
| FR | 2 893 803 | 5/2007 |

OTHER PUBLICATIONS

Urien, P., "Internet card, a smart card as a true Internet node", Computer Communications, Elsevier Science Publishers BV, Amsterdam, NL, vol. 23, No. 17, Nov. 1, 2000, XP004238469, ISSN: 0140-3664, pp. 1655-1666.

(Continued)

*Primary Examiner* — Seung Lee
(74) *Attorney, Agent, or Firm* — Young & Thompson (57) ABSTRACT

A smart card (1) storing a first and a second application (120, 220) and elements for receiving commands originating from outside the card (1), the first application (120) being capable of executing first commands, the smart card includes elements (130) for determining (706) whether a received command is implemented by the first application so as to transmit (708) the received command to the second application (220) in the case of a negative determination. Notably, the determination can implement either a table (130) listing the first commands, or conditional instructions provided within the execution code for the first application. Application of the invention to a second highly-securitized application, of the banking transaction type, and to a first less-securitized application, of the mobile telephone application type.

19 Claims, 4 Drawing Sheets

OTHER PUBLICATIONS

Khachtchanski V. I. et al. "Universal SIM Toolkit-based client for mobile authorization system", International Conference on Information Integration and Web-Based Applications and Services, XX, XX, Sep. 10, 2001, XP002282125, pp. 337-344.

"NFC Forum—Frequent Asked Questions" Internet Citation, [Online] XP007900764 Extrait de I'Internet: URL:http://www.nfc-forum.org/aboutnfc/faqs/_28-06-2006> [extrait le Jun. 28, 2006] * le document en entier*.

"Mithoren und/oder Beeinflussen des SWP" Research Disclosure, Mason Publications, Hampshire, GB, vol. 520, No. 12, Aug. 1, 2007, XP007137523, ISSN: 0374-4353, pp. 824.

Search Report dated Jun. 23, 2008, from corresponding French application.

* cited by examiner

SMART CARD, TELEPHONE COMPRISING SUCH A CARD AND METHOD FOR EXECUTING A COMMAND IN SUCH A CARD

SUMMARY OF THE INVENTION

The present invention relates to a smart card. It is more particularly applicable to smart cards according to the ISO 7816 and to smart cards according to the MMC (acronym for MultiMedia Card) standard. The invention also relates to a mobile telephone comprising such a card and a method for executing a command on such a card.

BACKGROUND OF THE INVENTION

Some smart cards can comprise several applications, stored in non-volatile memory, for example in a ROM or EEPROM memory, in other words their microprocessor has available in memory executable (or interpretable) codes for several computer program applications and is designed to execute them in order to accomplish a task or to fulfill a particular function.

It is common to wish to store and to execute two independent and autonomous applications on the same card. Two applications can be independent in the sense that their respective codes do not make use of commands or data specific to the other application. Their execution is then independent. On the other hand, it is not ruled out that, during their respective executions, they occasionally become partners and exchange data between them as do a large number of applications.

It may, for example, be envisioned that a first default application is a mobile telephony application, if the system is a mobile telephony card designed for a mobile telephone, and that a second application is a banking application used in an occasional manner, for example, in order to make a payment by means of the telephone. This can notably allow the smart card to comply, for example, with both a mobile telephony standard (for example, a GSM [acronym for "Global System for Mobile Communications"] standard or ETSI [acronym for "European Telecommunications Standards Institute"] standard) and with a banking standard (for example EMV [acronym for "Europay Mastercard Visa"]).

Typically, these applications receive data and commands from outside the card in order to carry out a task or perform a particular function.

For software engineering, fabrication and/or certification reasons, it does not turn out to be practical to define, in the first application, a reference to the second application or the commands that the second application accepts. If this were the case, the code for the first application would then be dependent on the second application. It would then become extremely complex and costly in modifications to the first application if it were desired to modify or to replace the second application, or even to add a third application.

The invention aims to overcome these drawbacks by providing a smart card that determines the assignment of the commands received with respect to an application, notably a preponderant one in the sense that the latter processes all the commands received by the smart card, solely according to this application.

For this purpose, a subject of the invention is notably a smart card storing a first and a second application and comprising means for receiving commands originating from outside the card, said first application being capable of executing first commands, the card comprising means for determining whether a received command is implemented by the first application so as to transmit said received command to the second application in the case of a negative determination.

Accordingly, the determination is carried out solely with respect to this first application, without any knowledge of the other application or applications. It is thus possible to have independent and autonomous applications executed on the card without this being detrimental to the execution of the commands.

It is thus possible notably to perform separate certification and/or design tasks on the applications.

When it is determined that the received command is not intended for the first application, this command is naturally transmitted to the other application.

It is noted that this solution is inexpensive in terms of development in the sense that modification of the standard is not required in order to add, for example, complementary information to the commands or to modify the applications.

In one embodiment, said receiving means are configured for transmitting said received commands to said first application and said determination means form part of said first application.

In one embodiment, said determination means comprise means for comparing the received command with at least one of said first commands. The determination is thus adapted to the existing means of the first application.

In particular, for as long as the received command does not correspond to a command of the first application, the comparison with all of the first commands is carried out. Thus, a negative determination decision is only taken after having analyzed all of the first commands.

In one embodiment of the invention, the determination means comprise a table stored in memory comprising a list of said first commands. The complexity of this embodiment is low since both the table and the comparison with this table are mechanisms that are widely used and understood. Furthermore, this embodiment makes the updating of this table straightforward and inexpensive when the first application is modified or changed.

In order to speed up the processing of the received command if this must be executed by the first application, the table is also designed to comprise, for each first command listed, an address for execution of said first command by the first application.

According to one variant which may also be used in combination, the determination means comprise at least one conditional instruction within the execution code of said first application. Typically, the conditional instructions take the form of a function "if condition then . . . else . . . ".

This embodiment only requires the execution of the is first application upon receiving the command in order to carry out the determination.

In combination, this embodiment allows the execution code of the first application to be protected in the case where the table contains errors.

In particular, the determination means comprise a single conditional instruction comparing said received command with all of said first commands. This solution then requires the corresponding condition to carry out the comparison between the received command and the first commands, preferably all of these first commands. The use of only one conditional instruction allows the processing of the received command to be expedited.

As an alternative, the determination means comprise a plurality of conditional instructions each relating to at least one first command. Each conditional instruction may for example be designed to compare the received command with one of the first commands. It is noted here that the determination is negative if none of the conditions is verified. This solution may notably be applied in the case where there are a large number of first commands, because the conditions are then readily executed with few resources.

In some cases, smart cards may comprise, at the same time, an application with severe security requirements and an application with moderate security requirements.

Typically, applications with severe security requirements are, for example, payment or holder identification applications (passport, identity card). For these applications, the customers demand a high level of security which requires particularly long and costly evaluation procedures, for example according to common criteria, carried out by a certified independent body. Certain assessment procedures can last over a year and cost several tens of thousands of euros for one model of smart card. Generally speaking, a new assessment, which is optionally streamlined, must be carried out when the application is upgraded.

Applications with moderate security requirements are, for example, mobile telephony applications (for example for identifying a subscriber to a mobile telephony network) or transport applications (for example, access to a public transport network). These applications do not generally require certification or require a much shorter and much less costly certification procedure than the previous examples.

When these two types of applications co-exist within the same smart card microprocessor, the applications with moderate security requirements must be assessed and certified according to the same criteria as the applications with high security demands, which implies high costs and lengthy delays.

Furthermore, it is known that smart card readers are generally designed to read a smart card via contacts provided for this purpose on the surface of the smart card whose function is generally pre-determined and does not change over the lifetime of the reader. In order to adapt to a new function for a contact, the reader electronics generally need to be modified, which is generally not feasible (at a reasonable cost) for the consumers using these readers.

Moreover, the number of contacts according to the ISO 7816 standard is limited to 8, five of which are used for the protocol according to the ISO 7816 standard (c1, c2, c3, c5, c7), two of which may be used by a high-speed USB protocol (for example c4 and c8) or three in the case of an MMC protocol, which limits the capacity for upgrade development of smart cards.

The invention may therefore provide for the smart card to comprise a first and a second microprocessor for respectively executing said first application and said second application.

By separating the two microprocessors in the present invention, a smart card reader can send commands to the two microprocessors without it becoming necessary to implement additional contacts with respect to the case where commands would be sent to only one microprocessor. Moreover, the security of the first and second microprocessors can be certified independently.

In one embodiment, the card comprises at least one input/output line, preferably according to the ISO 7816 standard, which connects the two microprocessors and is used to transmit said received command between the two microprocessors.

Notably, a clock link is provided which connects the two microprocessors in such a manner that said first microprocessor supplies a clock signal to the second microprocessor, notably according to the ISO 7816 standard. It is recalled that the clock signal according to the ISO 7816 standard corresponds to the contact c3 of the standard.

By virtue of these arrangements, the two microprocessors can operate with different clocks, for example with timings according to different clock frequencies.

According to particular features, the first microprocessor comprises means for inhibiting said clock signal supplied to the second microprocessor.

By virtue of these arrangements, in the case where the second microprocessor comprises means for going into standby in the absence of a clock signal, in order notably to conserve the current supplied by the reader, which can be particularly critical when the reader is in a portable device powered by a battery, such as a mobile telephone, the first microprocessor can control the standby mode of all or a part of the second microprocessor.

In one embodiment, said two microprocessors are mounted on the same module printed circuit (for example, a microprocessor module, also referred to as a chip). This results in an enhanced simplification of the independent certification of the two microprocessors, with a view notably to obtaining a highly securitized microprocessor.

According to one variant, the card comprises a card body and a module printed circuit accommodated by the body, said first and second microprocessors being respectively provided on said module printed circuit and in said body, and interconnected via conducting tracks provided in the card body.

It may notably be chosen that the first microprocessor implements a lower level of security than the second microprocessor.

By virtue of these arrangements, a smart card reader only implementing the security level of the first microprocessor can control the operation of the second microprocessor. Moreover, the second microprocessor can have its security enhanced owing to the fact that it receives its commands only from the first microprocessor.

In one variant to the two microprocessors, the card is designed to comprise a module printed circuit equipped with the same first microprocessor for executing said first and second applications.

According to one possible feature of the invention, the card comprises a first microprocessor for executing said first application, in which card the receiving means comprise electrical contacts designed to receive said commands, said electrical contacts being exclusively connected to the first microprocessor. Here, the electrical contacts for communicating (here exclusively connected to the first microprocessor) are differentiated from contacts potentially used for other purposes, for example for the component electrical power supply, which can optionally be connected to the other microprocessor without any detriment to the processing of the commands (which are received on the other contacts).

In particular, the electrical contacts are flush with the card surface. A contact card reader is then employed.

In one embodiment, said electrical contacts are provided on one face of a module printed circuit and said microprocessors) is (are) mounted on the other face of said module printed circuit.

By virtue of these arrangements, a robust mechanical protection for the microprocessor(s) is obtained.

Conventionally, the receiving means are designed to transmit outside of the card responses to the received commands. Bidirectional communications are thus established with the card, notably for carrying out transactions.

It has previously been seen that, by virtue of the invention, the same electrical contacts are used as for the cards comprising only one application. In order to enable efficient bidirectional communications with the second application, the first application is designed to pick up the responses from the second application prior to transmitting them outside of the card.

Notably, the communications between the applications can be effected by means of APDU (acronym for "Application Protocol Data Unit") commands.

According to one embodiment, said first application complies with a mobile telephony standard, notably an application for identifying a subscriber to a mobile telephony network.

According to one variant, said first application comprises a smart card web server, also written as SCWS.

In one embodiment, said second application is a payment application, notably according to the EMV (acronym for "Europay Mastercard Visa") standard.

According to one possible feature of the invention, the receiving means comprise means for communicating with a wireless communications interface of a card reader. In practice, this wireless interface is combined with the electrical contacts, in which case it is also envisioned that the wireless interface be connected to the system via one or more of the electrical contacts. Notably, one or more electrical contacts may be dedicated to this wireless communications interface.

In use, it may be envisioned that only the second application uses the wireless interface.

Notably, said means of communication comply with the NFC (acronym for "Near-Field Communication") standard. Thus, with a mobile telephone equipped with such means of communication, a payment can be effected with an existing payment microprocessor already certified according to the common criteria.

In particular, said means of communication may implement an SWP (acronym for "Single Wire Protocol") communications protocol with the card, notably with the first microcircuit or the first application.

The case where there are a large number of applications embedded and executed in the smart card is also envisioned. In this case, even if the determination means determine that the received command is not destined for the first application, they cannot know to which application the command is to be transmitted.

It is then planned to apply, in a recursive manner, the mechanism described hereinabove, namely that once the received command has been transmitted to the second application, the latter plays the role of the first application for the following iteration.

Thus, according to particular possible features of the invention, the smart card comprises a third application and, in the case of transmission of the received command to the second application, if the received command is implemented by said second application, said determination means are designed so as to transmit said received command to the third application in the case of a negative determination, said determination means comprising means for comparing the received command with at least one command implemented by said second application.

This feature may also be included in a definition of smart card comprising a plurality of hierarchized applications and means for receiving commands originating from outside the card, the card comprising means for determining, in the case of transmission of the received command to one of said applications, whether the received command is implemented by said application so as to transmit said received command to the lower level application in the case of a negative determination, said determination means comprising means for comparing the received command with at least one command implemented by said application.

The smart card may also be designed to comply with the ISO 7816 standard and/or the MMC (acronym for "MultiMedia Card") standard.

According to one possible feature of the invention, the smart card is of the SIM (acronym for "Subscriber Identity Module") or USIM (acronym for "Universal Subscriber Identity Module") type.

According to another possible feature of the invention, the card complies with the ID-000 format according to the ISO 7816 standard.

Another subject of the invention is a device comprising a smart card such as is presented hereinabove. In particular, this device may be a terminal, a host station or else a reader; for example, a mobile telephone or a personal computer.

Another subject of the invention is a method for executing a command by a smart card storing a first and a second application, said first application being capable of executing first commands, the method comprising the following steps:
  receiving a command from outside the card,
  upon receiving it, determining whether the received command is implemented by said first application,
  in the case of a negative determination, transmitting said received command to the second application.

Optionally, the method may implement means relating to the smart card features presented hereinabove.

Notably, the receiving step can comprise the reception of said command by the first application.

Equally, the determination can comprise the comparison of the received command with at least one of said first commands.

According to one embodiment, the determination comprises the comparison of said received command with a table listing said first commands.

As an alternative, said determination comprises the execution, by said first application, of a conditional instruction included in the code of said first application. In particular, said determination comprises the execution of a single conditional instruction, said determination being negative when said condition is not met. As a variant, said determination comprises the execution of a plurality of conditional instructions each relating to at least one first command, said determination being negative when together the conditions are not met.

In one embodiment, the method comprises, in the case of a negative determination, a step for transmission, by said first application and upon command from said second application, outside of the card of at least one response to the received command. An external smart card reader thus obtains a bidirectional communication with the second application.

Since the advantages, objectives and particular features of this method, and of this telephone and of this process for marketing are similar to those of the card, subject of the present invention, such as is succinctly described hereinabove, they are not recalled here.

BRIEF DESCRIPTION OF THE DRAWINGS

Other advantages, objectives and particular features of the present invention will become apparent from the description that follows, presented by way of non-limiting explanation with reference to the appended drawings, in which.

DETAILED DESCRIPTION OF THE PREFERRED EMBODIMENTS

Figure 1:
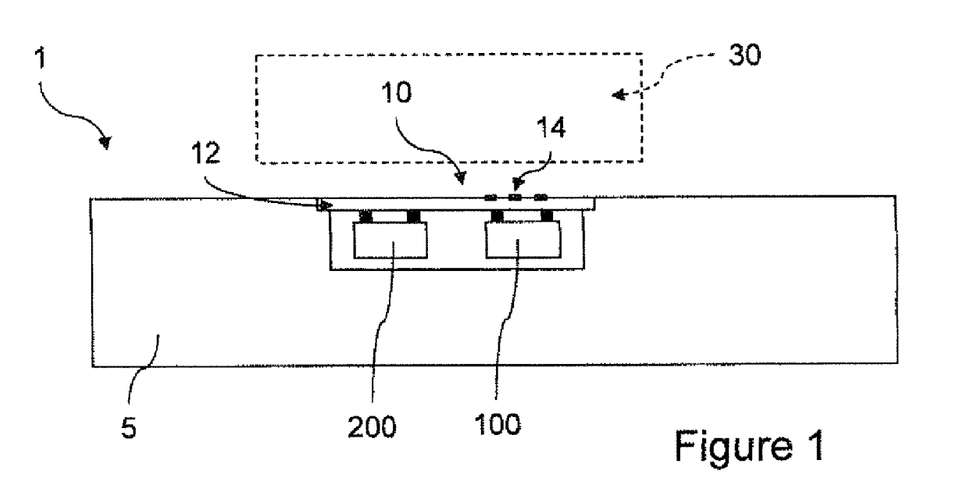
FIG. 1 shows schematically a first embodiment of the invention.

In FIG. 1 can be seen: a smart card 1 comprising a plastic substrate 5 forming card body and an electronic module 10 integrated into the card body.

The electronic module 10 is formed from a printed circuit 12 and from electrical contacts 14 provided on the exterior face of the circuit 12 and designed to be connected to a reader 30, notably eight flush contacts c1 to c8 according to the ISO 7816 standard, and a first microcircuit 100 and a second microcircuit 200 integrated onto the internal face of the circuit 12 in such a manner as to provide a mechanical protection for the latter. The two microcircuits 100 and 200 are connected by means of the printed circuit 12, thanks notably to conducting tracks provided on this circuit and connections between these tracks and the integrated circuit (microcircuit) 100 and 200.

The electrical contacts 14 are only connected to the first microcircuit 100.

The first microcircuit 100 comprises a first microprocessor 110 associated with a first memory storing executable (or interpretable) code instructions of a first application 120. The second microcircuit 200 comprises a second microprocessor 210 associated with a second memory storing executable (or interpretable) code instructions of a second application 220. For example, each of the microcircuits 100 and 200 is a microcontroller comprising a microprocessor and a memory.

Preferably, by means of the first and second applications, the first microprocessor 110 implements a level of security lower than the second microprocessor 210. For example, the first application is an application for identification of a subscriber to a mobile telephony network, called SIM (acronym for "Subscriber Identification Module") and the second application is a banking payment application, for example according to the EMV (acronym for "Europay Mastercard Visa") standard. As a variant, the microprocessor 110 is more secure than the microprocessor 210.

It is recalled here that security levels are well known to those skilled in the art. In particular, microprocessors and banking applications are generally certified according to the common criteria method (corresponding to the ISO 15408 standard) at a higher or equal level to EAL4 (acronym for "Evaluation Assurance Level 4"), typically at the level EAL4+. In contrast, the microprocessors and mobile telephony applications are not generally certified according to the common criteria. This is explained by the fact that, in the field of mobile telephony, there are less severe demands in terms of securitization and more severe demands in terms of response time of the card than in the payment field.

The card reader 30 is a mobile telephone in the case where the first application is a mobile telephony application.

A first internal (input/output) link connects the two microprocessors 110 and 210 together and enables the exchange of information between them. Preferably, information exchanges taking place over the internal link comply with the ISO 7816 standard. Where necessary, the first microprocessor 110 connected to the contacts 14 can be designed to carry out a format conversion on the data received on the contacts into an ISO 7816 format destined for the other microprocessor 210 (and vice versa in the other direction of communication).

A second internal (clock) link carries a clock signal from the first microprocessor 110 to the second microprocessor 210, allowing the first to drive or to inhibit the operation of the second. A third internal link (reset) carries a signal for setting to zero, from the first microprocessor 110 to the second microprocessor 210, allowing the first to control the reset of the second.

In other embodiments, the first microprocessor 110 comprises receiving means complying with a protocol for communicating with a wireless communications interface according to the SWP (Single Wire Protocol) communications protocol.

Figure 2:
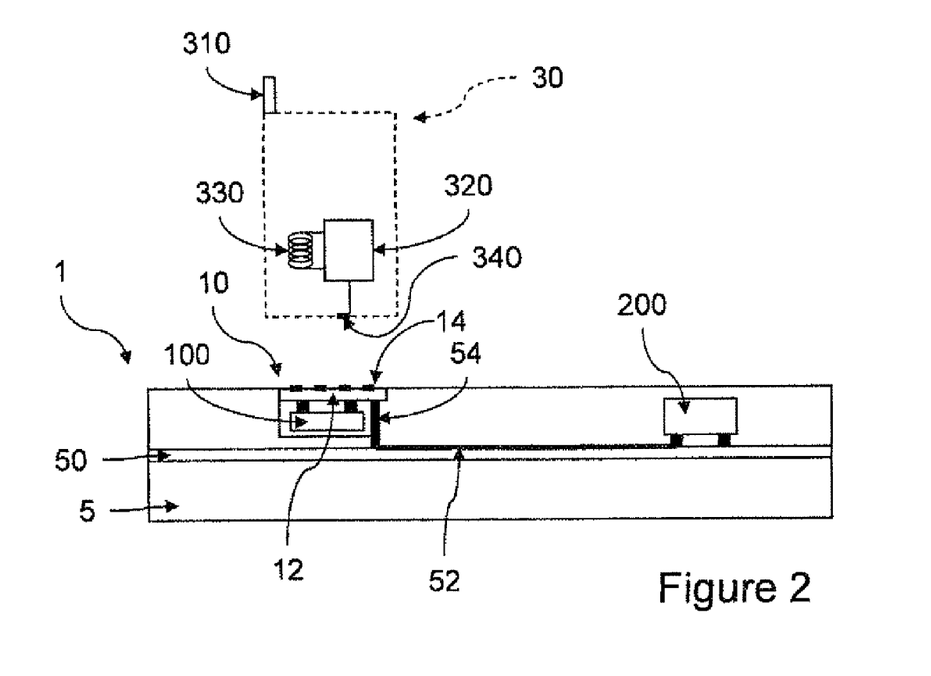
FIG. 2 shows schematically a second embodiment of the invention.

In FIG. 2 can be seen a card 1 having elements in common with the card in FIG. 1.

In FIG. 2, the electronic module 10 only accommodates the first microcircuit 100.

The second microcircuit 200 is integrated into the card body 5 at an intermediate layer level 50 according to a flip-chip process.

The two microcircuits 100 and 200 are connected via a conducting track 52 deposited on the layer 50 during the fabrication process. A metalized hole 54 in the first microcircuit 100 allows the latter to be electrically connected to the conducting track 52.

It is furthermore observed that the reader 30 is composed of a mobile telephone equipped with an antenna 310 and with an interface circuit 320. The interface circuit 320 is of the very-short-range type, for example according to the NFC standard, is equipped with an interface antenna 330 and is connected to a contact 340 designed to communicate with one of the contacts 14 on the card 1, for example the contact c4.

An external reader (not shown) equipped with a very-short-range communications interface, for example according to the NFC standard, communicates with the mobile telephone 30 via the interface 320.

It is noted here that the contact c4 used for the wireless communication is different from the other contacts used for communication by contact, in order notably to facilitate the differentiation of the data arrival channels.

"Very-short-range" is understood to mean a range of less than 1 meter, preferably less than 50 cm, typically less than 20 cm. These could be communications means for example according to the NFC (acronym for "Near-Field Communications") standard or to the ISO (acronym for "International Standards Organization") 14443 standard relating to radiofrequency identification (or RFID), although the invention is not limited to these protocols.

One advantage of the very short range is notably to allow a user to initiate, voluntarily or consciously, wireless communications by bringing a portable device up to a fixed reader, typically to a distance of a few centimeters. For example, in the case of a contactless payment smart card, for example with dimensions according to the ISO 7816 standard, such a range limits the risks of the card holder's account being debited without the holder having expressed his wish to do this by placing his card at a few centimeters from an appropriate reader, and by thus initiating a payment transaction between the reader and his card.

In the case of applications with high security demands, for example transaction or payment applications, the external reader transmits commands destined for the second microprocessor 210 and receives responses from it. These commands are designed to be recognized by the first microprocessor 110 as destined for the second microprocessor 210, as presented hereinbelow.

A mobile telephone 30 of this kind can also be used with the card 1 in FIG. 1.

Figure 3:
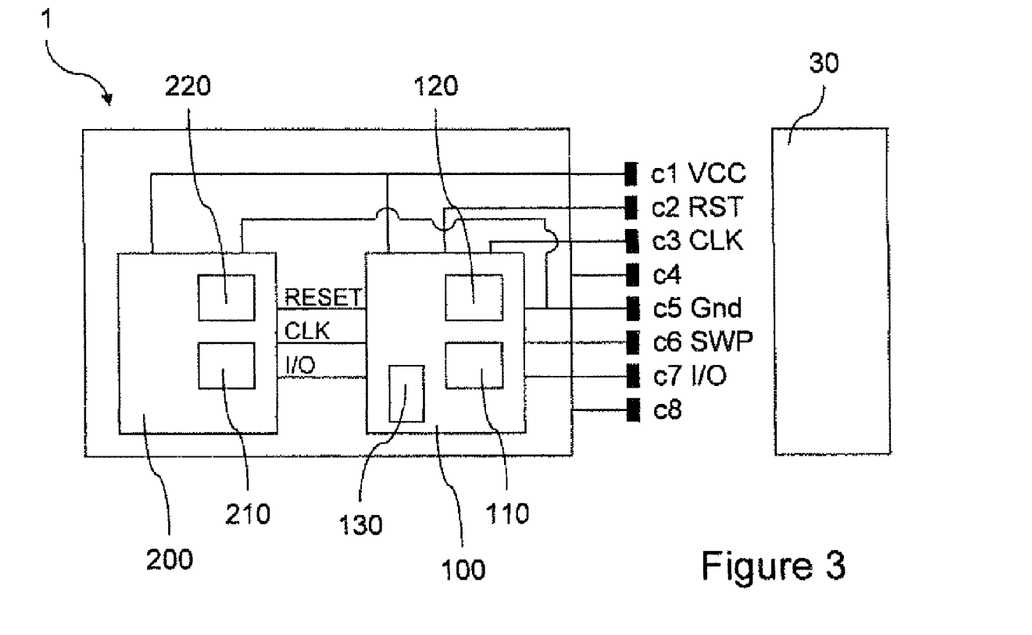
FIG. 3 shows a circuit diagram applicable to any one of the embodiments in FIGS. 1 and 2.

With reference to FIG. 3, the circuit diagram of the electronic module 10 in FIG. 1 or of the module 10 in conjunction with the microcircuit 200 in FIG. 2 is shown.

The eight electrical contacts c1 to c8 can be seen here, of which c1 (Vcc) and c5 (Gnd) supply the electrical power from the reader 30 to the components on the card.

The first contact, denoted "c1" in the ISO 7816 standard, is connected, via a first link, on the one hand to the first microprocessor 110 and, on the other, to the second microprocessor 210. This first contact c1 and this first link carry a DC voltage, generally denoted "Vcc", for powering the microprocessors 110 and 210 by the reader 30. It is noted here that the card 1 has no autonomous power supply. The contact c1 (combined with c5 hereinbelow) thus allows the card 1 and its internal components to be powered.

The second contact, denoted "c2" in the ISO 7816 standard, is connected, via a second link, to the first microprocessor 110. This second contact c2 and this second link carry a reset signal, generally denoted "RST", for resetting the microprocessor 110.

The third contact, denoted "c3" in the ISO 7816 standard, is connected, via a third link, to the first microprocessor 110 and carries a clock signal, generally denoted "CLK", so that the reader 30 can drive the timing of the operation of the first microprocessor 110.

The fourth contact, denoted "c4" in the ISO 7816 standard, is not connected to either one of the microprocessors 110 and 210.

The fifth contact, denoted "c5" in the ISO 7816 standard, is connected, via a fifth link, on the one hand, to the first microprocessor 110 and, on the other, to the second microprocessor 210. This fifth contact c5 and this fifth link are connected to ground, generally denoted "GND", for the power supply of the microprocessors 110 and 210 by the reader 30.

The sixth contact, denoted "c6" in the ISO 7816 standard, is connected, via a sixth link, to the first microprocessor 110 and carries a data signal, here denoted "SWP", implementing the SWP protocol, or "single-wire protocol", for the communication of the first microprocessor 110 with the reader 30. It is noted that the reader 30 sends commands to the card 100 using, for example, this contact c6.

The seventh contact, denoted "c7" in the ISO 7816 standard, is connected, via a seventh link, to the first microprocessor 110 and carries data, generally denoted "I/O", so that the reader 30 and the first microprocessor 110 can exchange data. It is noted that the reader 30 sends commands to the card 10 using, for example, this contact c7.

The eighth contact, denoted "c8" in the ISO 7816 standard, is not connected to either one of the microprocessors 110 and 210.

The input/output line I/O, clock line CLK and reset line RESET between the two microcircuits 100 and 200 can also be seen. In FIG. 2, these lines are carried by the conducting tracks 52.

In the microcircuit 100, aside from the application 120 executed by the microprocessor 110, a table 130 stored in memory is provided.

This table 130 lists all of the commands used by the application 120, here command1, command2, command3. With each of these commands is also associated the address for execution of the command. This is, for example, a pointer to the instruction or binary code to be executed for this command. Thus, when a search of this table is undertaken, as illustrated hereinafter, the first application is not penalized if the command sought is already in the list, then this command can be immediately executed by virtue of this address.

This table 130 can notably be generated when the application 120 is compiled at its design stage, and delivered to the card 1 at the same time as this application.

Figure 4:
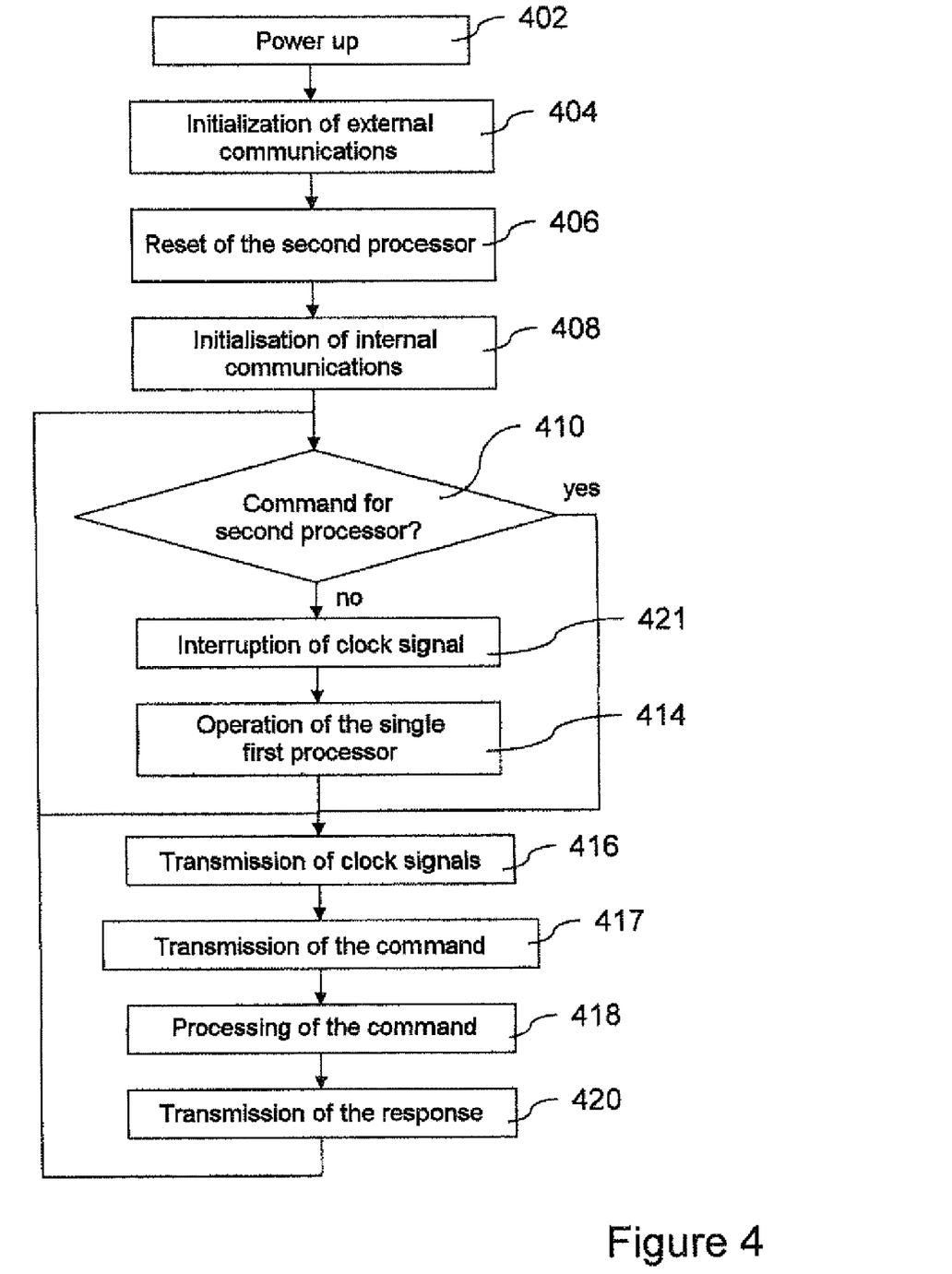
FIG. 4 shows, in the form of logic diagram, steps in one embodiment of the method according to the invention.

With reference to FIG. 4, the process of operation of the card 1 is now described. At step 402, the card 1 is powered up (and hence the microcircuits 100 and 200) by the reader 30. Then, during a step 404, the communication between the card 1 and the reader 30 is initialized according to the ISO 7816 standard.

During a step 406, the first microprocessor 110 sends a reset signal to the second microprocessor 210 together with a clock signal allowing it to drive the timing of the operation of the second microprocessor 210. In the embodiment described in FIG. 3, the first microprocessor 110 supplies a reset signal in a manner according to the ISO 7816 standard to the second microprocessor 210, this signal corresponding to the contact c2 in the ISO 7816 standard.

During a step 408, the microprocessors 110 and 210 initialize the communication between them. In the embodiment described and shown, this communication is carried out according to the ISO 7816 protocol. In this communication, the first microprocessor 110 behaves as a reader of the second microprocessor 210, with the exception of the supply of electrical power, which is provided directly via the contacts c1 and c5.

During a step 410, the first microprocessor 110 receives at least one command coming from the reader 30. This command forms part of a more general process which is described hereinafter with reference to FIGS. 6 and 7.

For example, this command is received by the card 1 on the contact 14 (c7) and complies with the ISO 7816 standard (this is an APDU command) or it is received by the contact 14 (c4 or c6) and complies with the SWP protocol. The first microprocessor 110 then determines whether it has received a command from the reader 30 destined for the second microprocessor 210 within a pre-determined period of time, for example the last five seconds.

For this purpose, the first microprocessor 110 determines whether the received command is intended for it before thus concluding, if this is not the case, that this is a command destined for the second application 220.

For this purpose, several embodiments may be implemented in order for the first microprocessor 110 to determine whether it is the intended destination of a command.

According to one embodiment which, as such, is separately the subject of another application submitted by the same applicant, all the commands arriving on the same contact 14, for example the contact c4 which is connected to the very-short-range communications interface 320-330 (FIG. 2), are destined for the second application 220 (or, as a variant, for the first application 120).

In this case, the microprocessor 110 or the application 120 detects the contact terminal 14 over which the command arrives and directly determines therefrom whether this command is intended for it or not.

The first application 120, preponderant in the card 1, may also be designed to incorporate the communications means capable of receiving data from the interfaces 14. Thus, these means allow the first application 120 to know on which contact the command is received.

As a variant, communications means receiving the data on the contacts 14 may be separate from the first application 120. When the received command is transmitted to the first application, information on the contact number receiving the command can be added in order to enable this application to determine this contact number by simply reading the information.

As a variant, the first application can detect the protocol or the standard used for transmitting the commands in order to determine the communications channel.

In detail, taking the example hereinabove, if the first application detects an APDU command, it deduces from this that the contact c7 has received this command and hence that, for example, the first communications channel is used. In contrast, if a command according to the SWP protocol is received, the first application deduces from this that it has been received on the contact c4 and hence, for example, by the second channel.

The association (contact, protocol or standard) can be carried out and stored during an initialization phase of the card 1.

According to another embodiment implementing the table 130, the first microprocessor 110 extracts the received command.

It thus searches through the file of the table 130 stored in memory to check whether the received command is in the list. For example, it can extract each of the commands that are listed therein and then carry out a comparison of each of these commands with that received.

The comparison can be halted as soon as a comparison is positive, in which case the first microprocessor 110 concludes that it is the destination of the command: the determination is positive. The first application 120 then executes the received command.

If, at the end of the comparison with all of the commands listed, no comparison is positive, the first microprocessor 110 concludes that the command intended for it is not intended for it, and hence that it is intended for the other application 220: the determination is negative. The command is then transmitted to the second application 220, as seen hereinafter, for potential execution.

It is noted here that if more than two applications are executed in the card 1, a hierarchy of the applications is preferably established. By convention, a main application of highest level and applications of lower rank are considered. The establishment of this hierarchy allows, in the case of a negative determination, the received command to be transmitted to the application of lower rank. Of course, in the case of a positive determination for an application, the latter executes said command without transmitting it to another application.

Accordingly, from iteration to iteration, the received command is transmitted from application to application until it reaches the destination application that executes it without retransmitting it to its lower level application.

According to yet another embodiment, no table 130 is used. In this embodiment, the executable code of the first application 120 comprises conditional instructions, Thus, each instruction provided within the code is preceded by a test function applied to the command to be executed; for example, the function if received command=command1 then execution of the instruction command1 else . . . .

The tests may be designed to follow one another for each of the commands of the first application; explicitly:

```
if received command=command1 then execution
else if received command=command2 then execution
else ...
else if received command=command N then execution
else negative determination.
```

It is noted that several tests may be grouped together within one and the same if loop by using the OR operator between equalities.

In particular, the program may be designed to only perform one if operation by grouping, by means of OR operators, all the equalities received command=command i within one and the same if loop.

In this embodiment, the last if loop is exited via the else path only in the case of a negative determination.

Thus, either the command is executed in the case of a verified equality without one of the conditions, or the command is transmitted to the second application 220 by way of the else branch of the last if loop, which then comprises an instruction to transmit the command to this application 220.

According to yet another embodiment, the use of the table 130 is combined with the use of the conditional instructions. In particular, the determination is firstly carried out using the table 130 and, subsequently, by means of the conditional instructions.

If the table 130 is correctly generated, the conditional instructions are only used to confirm that the received command really is intended for the first application 220. On the other hand, if the table 130 is corrupted, the conditional instructions afford an additional protection for the first application 220 against an execution malfunction (bug).

According to yet another embodiment, the detection of the contact 14 receiving the command in order to transmit it to the second application 220 can be combined with a check, for example if the contact does not allow an immediate decision to be taken (for example contact 14 used for both applications) with the aid of the table 130 and/or conditional instructions implemented within the executable code of the first application 120.

By virtue of these arrangements, specific contacts 14 may be readily used for certain applications and other contacts 14 dedicated to the two applications.

If the first microprocessor 110 has not received any command from the reader 300 destined for the second microprocessor 210 (hence no negative determination) during the pre-determined time period, the first microprocessor 110 interrupts the clock signal destined for the second microprocessor 210 and the latter goes into standby, during a step 412. This step 412 can readily be implemented by the first microprocessor 110 using a timer that counts the clock signals until a pre-determined number is reached and which then generates an interruption interrupting the transmission of the clock signal to the second microprocessor 210.

It is noted that, in the case where the second microprocessor 210 comprises means for going into standby in the absence of a clock signal, the inhibition of the clock signal transmitted by the first microprocessor 110 to the second microprocessor 210 allows the current supplied by the reader to be saved, which can be particularly critical when the reader is in a portable device powered by a battery, such as a mobile telephone. In some variants, the first microprocessor 110 can instruct part of the second microprocessor 210 to go into standby. The first microprocessor 110 then operates in a manner known to those skilled in the art, for example as a SIM card in the framework of a mobile telephony application, during a step 414, and periodically returns to step 410. During step 414, the first microprocessor executes each command destined for it and returns at least one response to the reader 30.

If, during a step 410, the first microprocessor determines that it has received at least one command from the reader 30 destined for the second microprocessor 210 (hence negative determination), the first microprocessor 110 sends the clock signal to the second microprocessor 210 and the latter goes back into operation, during a step 416. It is noted that for certain types of microprocessors and standby command modes, during step 416, where necessary the first microprocessor 110 sends a reset command to the second microprocessor 210.

During a step 417, the first microprocessor 110 transmits, to the second microprocessor 210, each command destined for the second microprocessor 210.

As a variant, the first microprocessor 110 generates commands for the second microprocessor 210 that are based on several commands received from the reader 30. As a variant, the first microprocessor 110 generates commands for the second microprocessor 210 that are based on at least one command received from the reader 30 and on information stored in the associated memory 120.

The second microprocessor 210 then processes this command, for example of the APDU type according to the ISO 7816 standard, and returns a response to the first microprocessor 110, destined for the reader 300, during a step 418.

By way of example and as illustrated in more detail hereinafter with reference to FIGS. 6 and 7, the processing step can form part of an authentication procedure based on "challenge/response" for which the second microprocessor 210 calculates a numerical data value, starting from a random data value received with the command and using a symmetrical key stored in memory. Ad hoc cryptographic means, for example software means, are then provided within the second microcircuit 200 and a key stored in a memory of the microcircuit 200.

Then, during a step 420, the first microprocessor 110 sends a response received from the second microprocessor 210 to the reader 30 and returns to step 410. This response is notably relayed by the first microprocessor 110 to the communications contacts 14. This step is notably presented in more detail hereinafter with reference to FIGS. 6 and 7.

The present invention thus allows the two types of applications to be made to co-exist on the same card and the applications with moderate security requirements to be readily updated, without having to get the applications with stringent security requirements re-certified and without modifying the latter.

Figure 5:
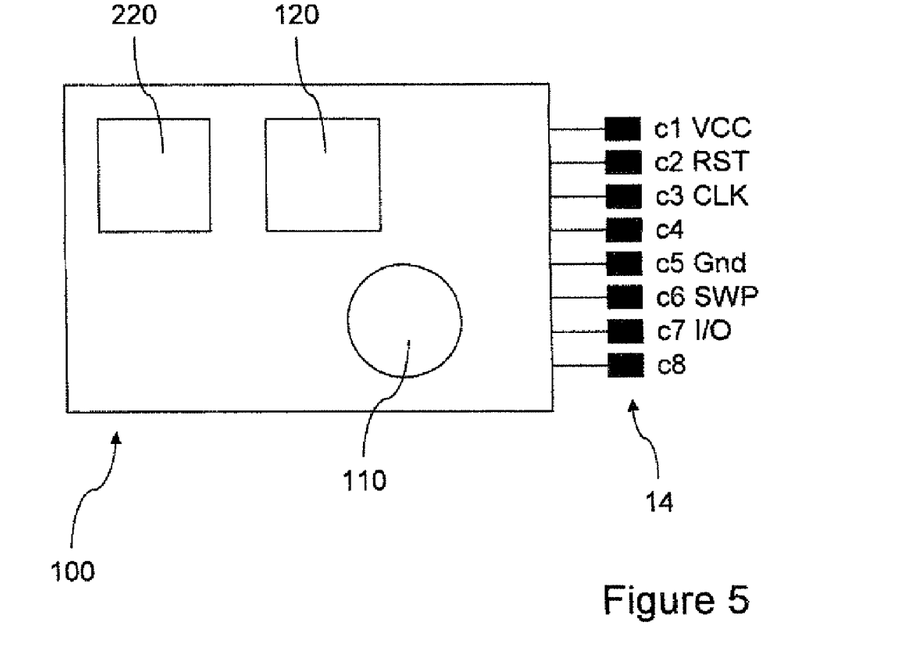
FIG. 5 shows schematically a third embodiment of the invention.

In FIG. 5, an embodiment of the invention based on only one microcircuit 100 can be seen.

The microcircuit 100 (carried by a card body not shown) has a single multi-tasking microprocessor 110 for the execution of the two applications 120 and 220.

The principles stated previously are applicable to this embodiment, notably the use of the table 130, of the conditional instructions, and of a contact 14 dedicated to the second application.

The communications and controls between the two applications 120 and 220 are then solely effected via software application channels.

Figure 6:
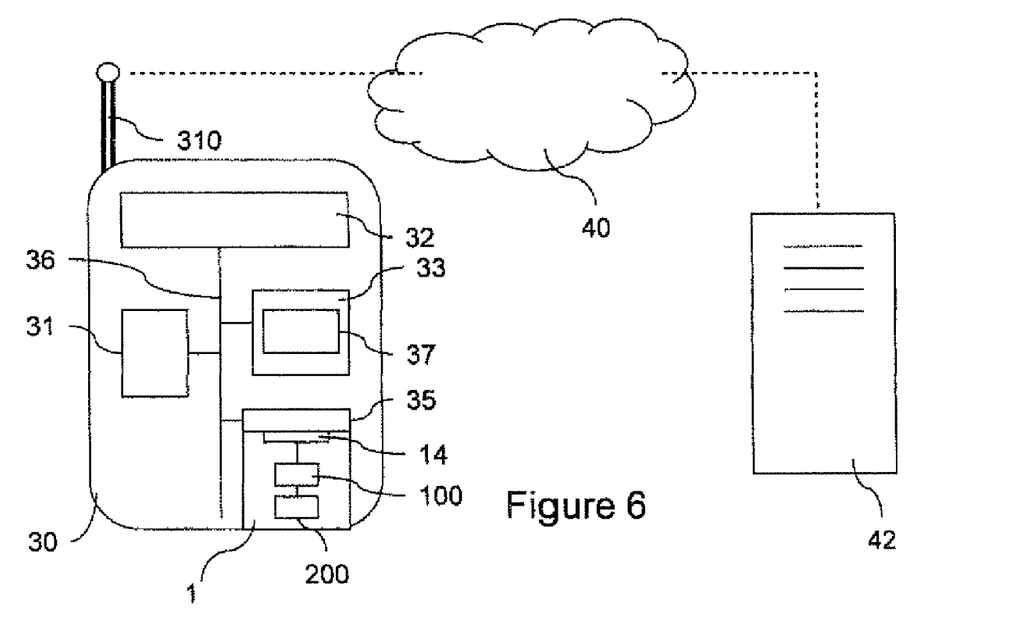
FIG. 6 shows schematically an overall system in which a card according to the invention is implemented.
Figure 7:
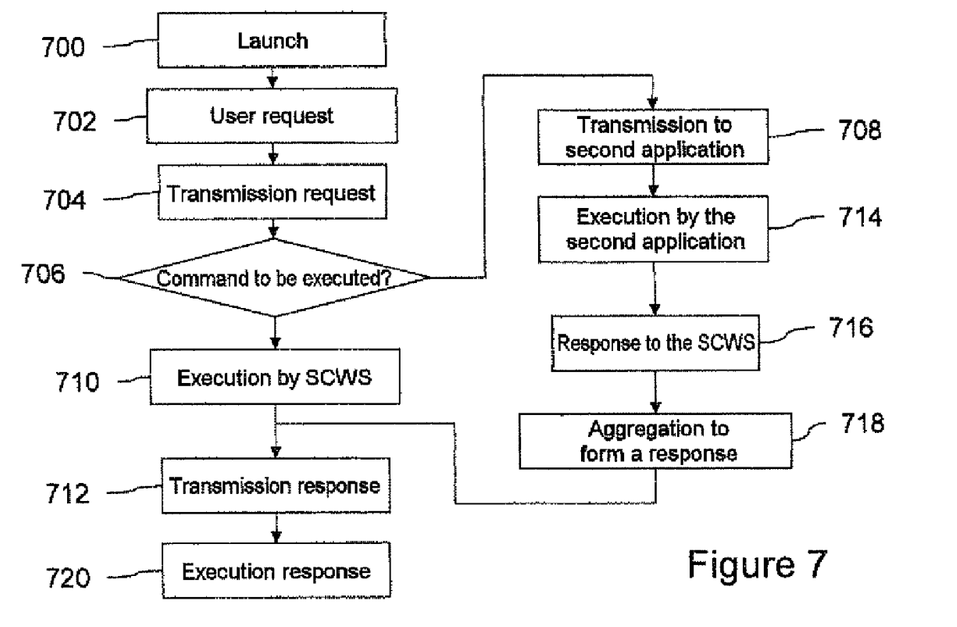
FIG. 7 shows, in the form of a logic diagram, steps in an exemplary operation of the system in FIG. 6.

With reference now to FIGS. 6 and 7, a banking application implementing the invention is described.

The mobile telephone 30, reader of the smart card 1, is again seen here.

The mobile telephone 30 possesses operational components, notably a CPU (Central Processing Unit) 31, a display screen 32, one or more memories 33, for example a ROM and a RAM memory, means of communication 34 with the mobile telephony network 40 and an interface 35 with a SIM card 1 at the electrical contacts 14.

These components are interconnected by means of a data bus 36.

The CPU 31 is capable of executing applications contained in memory 33, notably an onboard operating system (not shown) that enables the mobile telephone to be operated in the conventional manner.

The memory 33 also comprises a known application of the web browser type 37, executable by the CPU 31, in order to allow the user to access a remote Internet network, for example via the aforementioned WAP protocol. A keyboard or input device (not shown) provided on the mobile telephone 30 allows the user to interact with the web browser 37 when the latter is executed by the CPU 31. The return information supplied by the web browser 37 is displayed on the screen 32 of the telephone 30.

The card 1 and the components of the telephone 30, notably the browser, communicate via the OMA (Open Mobile Alliance) standard OMA-TS-Smart card_Web_ServerV1.

The first application 120 is a smart card server, for example a web server ("Smart card Web Server") and the microcircuit 100 stores web pages in memory.

The second application 220 is an electronic cash facility application.

With reference to FIG. 7, a user wishing to check his electronic cash balance and, as the case may be, to top it up is now described.

At step 700, the user launches the web browser 37 which then initiates an execution context proper and displays a home web page for managing the cash facility.

At step 702, the user selects an action from the page displayed, for example he clicks a link "check balance".

At step 704, the browser 37 sends an HTTP request to the server SCWS 120 according to the user's request. This HTTP request can notably comprise a function "check_balance" which is implemented by the application 220 of the cash facility.

At step 706, the server SCWS 120 receives the request and determines whether the received command "check_balance" is intended for it, according to one of the aforementioned mechanisms in relation to FIG. 4.

At step 708, the server 120 has determined that the command must be transmitted, and therefore transmits it to the application 220. Notably, the server 120 converts the command "check_balance" into an APDU command destined for the second application 220. The use of a conversion table may for example be envisioned in order to convert at least a part of the commands received via HTTP request (and in a general manner, according to any protocol, for example SWP) into an APDU command destined for the second application 220.

It is noted that, if the command received were destined for the server 120, then the latter would have executed it (step 710) and would have sent the result, i.e. an HTTP response, for example a new HTML page, to the browser (step 712).

Following the transmission, at step 714, the cash application 220 executes the command. In the case in question, the application determines the value of the cash balance remaining in the account as a function of historical transaction data (credits and debits) recorded in memory in the microcircuit 200.

At step 716, the second application 220 returns the balance calculated to the web server 120.

At step 718, the web server 120 incorporates the balance obtained into an HTML page, a model of which is in memory in the first microcircuit. This model can for example contain additional data associated with the telephony service provider for the SIM card 1, notably a logo or user information such as his telephone number. The web server 120 thus forms an HTTP response that it transmits to the browser 37 at step 712.

At step 720, the browser 37 executes the HTTP response, in the present case it displays the HTML page containing the balance and the logo on the screen 32 of the telephone.

Later on, the user wishes to top up his cash facility 220 online, by using the remote banking server 42.

On the homepage for managing the cash facility, he clicks a link "top up cash facility".

An HTTP top-up request is sent to the SCWS server 120 as in step 704. This request comprises calling up a function initAuthen implemented by the SCWS server 120, for example:

```
<a href="http://microcircuit2/initAuthent">top up cash
    facility </a>
```

Via steps 706, 710, 712 and 720, a page having the function of verifying a secret code is generated and displayed on the screen 32:

```
<FORM    action="verifyCode"    method="post"
name=BankingCode
    Enter your personal code
    <INPUT type="password" name="Code" maxLength="4">
```

The user then inputs his personal code into the form displayed by the browser 37 and validates the form, which transmits an HTTP request to the server SCWS 120 (step 704).

The server 120 determines at step 706 that the command is a function "verifyCode" which is implemented by the cash facility application 220.

After transmission (step 708), the code is checked (step 714) by the cash facility application. If the code is correct, the SIM card 1 initiates a connection (for the transaction) with the banking server 42 by generating an HTTP response to the request (steps 718 and 712) on the basis of an identifier supplied by the cash facility application and of the code input and encrypted by an encryption key (step 716). The response contains the following HTML page. The browser 37 executes and displays (step 720) this page to the user on the screen 32:

```
<HTML>
    <HEAD>
        <TITLE>PIN correct</TITLE>
        <META http-equiv="Refresh" content=
        "1;
        URL=https://www.mybank.com/HomeBanking.cgi?code=123">
    </HEAD>
    <BODY>
        Please wait, verification in progress...
    </BODY>
</HTML>
```

It is noted here that the meta-data identified by the marker <META> comprises an automatic redirection, here after content=1 second, toward the address of the banking server 42, here https://www.mybank.com/HomeBanking.cgi?id=123; code=85F6EE9, via a secure channel. The identifier 123 and the code input and encrypted 65F6EE9 are transmitted as parameters. Thus, at the end of this delay time of 1 second, the browser transmits an HTTP request to the address previously specified, here the banking server 42 and its main page.

Various steps of an authentication procedure are thus carried out between the cash facility application 220 and the banking server 42, based on a redirection mechanism within the browser 37.

Once the authentication has been carried out, identical and/or conventional mechanisms are used in order to allow the user to effectively top up his cash balance.

The preceding examples are only exemplary embodiments of the invention to which it is not limited.

The invention claimed is:

1. A smart card comprising:
    at least one CPU;
    at least one memory device having stored therein a first and a second computer application each comprised of executable code executable on the at least one CPU; and
    means for receiving executable commands that are executable by at least one of the computer applications and for making received executable commands available to the first computer application, said received executable commands originating from outside the card,
    said executable code of said first computer application configured to cause said at least one CPU to execute first commands of said received executable commands; and
    means (130) for determining (706) whether a received executable command is implemented for execution by the first computer application, and upon a determination that the received executable command is not implemented by the first computer application, transmitting said received executable command to the second computer application,
    wherein said means for determining comprise means for comparing the received executable command with at least one of said first commands, and
    wherein said means for determining are implemented via at least one conditional instruction within the executable code of the first computer application.

2. The smart card (1) according to claim 1, wherein said receiving means are configured for transmitting said received executable commands to said first computer application and said determination means form part of said first computer application.

3. The smart card according to claim 2, wherein said determination means comprise means for comparing the received executable command with at least one of said first commands.

4. The smart card according to claim 1, comprising a first and a second microprocessor for respectively executing said first computer application and said second computer application.

5. The smart card according to claim 4, wherein a clock link connects the first and second microprocessors in such a manner that said first microprocessor supplies a clock signal to the second microprocessor.

6. The smart card according to claim 5, wherein the first microprocessor comprises means for inhibiting said clock signal from being supplied to the second microprocessor if the smart card does not receive an executable command that has to be transmitted to the second computer application during a predetermined time period.

7. The smart card according to claim 6, wherein the first microprocessor (110) implements a level of security lower than that of the second microprocessor.

8. The smart card according to claim 5, wherein the first microprocessor implements a level of security lower than that of the second microprocessor.

9. The smart card according to claim 4, wherein the first microprocessor implements a level of security lower than that of the second microprocessor.

10. The smart card according to claim 1, wherein the receiving means comprise electrical contacts configured to receive said received executable commands, said electrical contacts being exclusively connected to a first of the at least one CPU.

11. The smart card according to claim 1, wherein said first computer application identifies a mobile telephony network subscriber according to a mobile telephony standard.

12. The smart card according to claim 1, wherein said first computer application comprises a smart card web server.

13. The smart card according to claim 1, wherein said second computer application is a payment application.

14. The smart card according to claim 1, wherein the receiving means comprise means for communicating with a wireless communications interface of a card reader, said communications means implementing a Single-Wire communications protocol (SWP).

15. The smart card according to claim 1, wherein the card is one of a SIM or a USIM card type.

16. The smart card according to claim 1, wherein the first commands are stored in an in-memory table, said in-memory table used for comparing the received executable command with the at least one of said first commands.

17. The smart card according to claim 1, wherein the at least one conditional instruction verifies each of the first commands that are executable by the first computer application.

18. A device comprising a smart card according to claim 1.

19. A method for executing a command by a smart card having stored thereon a first and a second computer application, said first computer application being capable of executing first commands, the method comprising the following steps:

receiving an executable command that is executable by at least one of the first and second computer applications, the executable command originating from outside the card;

upon receiving said executable command, determining whether the received executable command is executable by said first computer application by comparing, via at least one conditional instruction within an executable code of the first computer application, the received executable command with at least one command known to be executable by said first computer application; and in the case where said determining step determines that the received executable command is not executable by the first computer application, transmitting said received executable command to the second computer application.

* * * * *